United States Patent
Burrington et al.

(10) Patent No.: US 6,794,428 B2
(45) Date of Patent: Sep. 21, 2004

(54) CARBON BLACK COUPLER

(75) Inventors: James D. Burrington, Mayfield Village, OH (US); Benny R. Richardson, Borger, TX (US); Joseph W. Pialet, Euclid, OH (US); Ann E. Wykoff, Port Arthur, TX (US); Roger L. Sowerby, Concord Township, OH (US); Kenneth W. Lee, Borger, TX (US); Ralph E. Kornbrekke, Chagrin Falls, OH (US); Ghebrehiwet N. Ghebremeskel, Beaumont, TX (US); Kirk E. Davis, Chesterland, OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 10/220,452

(22) PCT Filed: Mar. 22, 2001

(86) PCT No.: PCT/US01/09290

§ 371 (c)(1),
(2), (4) Date: Oct. 29, 2002

(87) PCT Pub. No.: WO01/70866

PCT Pub. Date: Sep. 27, 2001

(65) Prior Publication Data

US 2003/0212189 A1 Nov. 13, 2003

Related U.S. Application Data

(60) Provisional application No. 60/191,427, filed on Mar. 23, 2000.

(51) Int. Cl.$^7$ ............... C08K 9/04; C08K 5/378; C08K 5/372; C08K 5/37

(52) U.S. Cl. ............ 523/205; 523/215; 524/571; 524/572; 524/573; 524/574; 524/575; 524/575.5; 525/331.8; 525/332.7; 525/332.8; 525/332.9; 525/333.1; 525/333.2; 525/351

(58) Field of Search ............ 106/473; 523/205, 523/215; 524/571–575.5; 525/331.8, 332.7, 332.8–333.2, 351

(56) References Cited

U.S. PATENT DOCUMENTS

| 3,884,285 A | * | 5/1975 | Russell et al. ............ 152/209.5 |
| 5,641,820 A | * | 6/1997 | Wideman et al. ............ 524/225 |
| 5,723,531 A | * | 3/1998 | Visel et al. ................ 524/496 |

FOREIGN PATENT DOCUMENTS

| EP | 0618191 A1 | * 10/1994 | ......... C07C/323/60 |
| EP | 0875529 A2 | 11/1998 | |
| WO | WO 93/23467 | 11/1993 | |

OTHER PUBLICATIONS

Abstract from Japanese Patent Office of JP 2000–239446 (Sep. 5, 2000) Tsukasa et al.*
Abstract from Japanese Patent Office of JP 09–278942 (Oct. 28, 1997) Katsumi et al.*

* cited by examiner

*Primary Examiner*—Matthew A. Thexton
(74) *Attorney, Agent, or Firm*—Samuel B. Laferty; Michael F. Esposito

(57) ABSTRACT

A coupler is described for use in carbon black filled rubber compositions. The coupler includes an amine group and a thiol group or a polysulfidic linkage. The coupler improves the interaction of the carbon black with the rubber as measured by a decrease in the tan delta at 60° C. while substantially maintaining the tan delta at 0° C.

22 Claims, No Drawings

CARBON BLACK COUPLER

This application claims priority from U.S. provisional application 60/191,427 filed Mar. 23, 2000.

FIELD OF INVENTION

Rubber compositions including those containing a coupler, or carbon black treated with a coupler, are described. The use of carbon black couplers has been hindered by the low number of functional groups on carbon black fillers that can potentially react with or otherwise bind to a coupler. A coupler would generally be expected to increase the interaction between the filler and an unsaturated rubber.

BACKGROUND OF THE INVENTION

Carbon black has been the reinforcing filler of choice for many years for tires and other rubber applications, which need toughness (high tensile and tear strength), wear resistance, long fatigue life, and variable hysteresis rubber compositions. Recently silica, when used with a silane coupler, has been used to replace all or part of the carbon black in some tire formulations. The entry of silane coupler/silica systems in tires has been motivated by the potential for reduced rolling resistance in the tires, which can increase fuel economy, along with retaining good wet skid resistance. To date, similar performance enhancements have not been economically possible with all-carbon black filled compositions.

SUMMARY OF THE INVENTION

A group of couplers (carbon black coupling agents) is described which can either improve the dispersibility of the carbon black or improve the bonding of the rubber to the carbon black or combinations thereof. The compounds are referred to as couplers because they have at least one amine group that can react with an acid group on the surface of the carbon black and either 1) a polysulfidic linkage, which can during vulcanization fracture and form a chemical bond to an unsaturated rubber, or 2) a thiol group, which can eventually form a chemical bond to an unsaturated rubber. Amine-bearing compounds have been shown to bind to the carbon surface, by reacting with strong acid groups. (S. D. Gardner, *Applied Spectroscopy*, 51 (5), 636, 1997). In some embodiments, the carbon black used has been chemically oxidized to increase the number of acidic groups. The increase in acidic groups tends to enhance the performance of the coupler but is not required in some applications. The couplers generally have one or more amine terminal groups and one or more ester or amide linkages in them. The coupler tends to decrease the tan delta of the final rubber compound at 60° C., which is associated with high fuel economy/lower rolling resistance, with less reduction in the tan delta at 0° C., which is associated with wet traction. A large inversion ratio (tan delta 0° C./tan delta 60° C.) is usually indicative of an improvement in tire performance when judged on the basis of hysteresis properties and wet traction. When compared with silica-based compositions, carbon black compounds are easier to mix and have lower costs due to the filler cost differences. Hence, the industry has been seeking carbon black formulations that approach silica in hysteresis performance (e.g. large inversion ratio). Rubber compositions including carbon black, the coupler, and an unsaturated rubber are useful in tires, e.g. tread compounds, and other rubber articles where it would be desirable to control the interaction between the carbon black surface and the rubber. These would include hysteretic properties but could also include other physical properties of the rubber such as wear resistance, tear strength etc. Other rubber articles where hysteretic properties are important include vibration damping devices and other devices where heat buildup from deformation or stress may cause reversion and consequently failure of the part.

DETAILED DESCRIPTION OF THE INVENTION

The coupler (compound capable of coupling carbon black to an unsaturated rubber) will be an amine-bearing compound having 1) at least one amine group and 2) at least one polysulfidic linkage or one thiol group. A preferred coupler in one embodiment will be the reaction product of 1) at least one amino compound (first compound), having at least one amine group (preferably terminal) and second reactive (functional) group selected from an amine group, a hydroxyl group, or a carboxylic group, and 2) at least a second compound having at least a thiol group or a polysulfidic linkage, and optionally, said reaction product further reacted with added elemental sulfur. The second compound would have at least one and possibly more than one reactive group that could react with the functional group(s) of the amino compound (the amino group, carboxylic acid group, or the hydroxyl group) to form an amide, imide, or ester linkage. The reactive group on the second compound could be an amino group, carboxylic acid group, or hydroxyl group, depending on the corresponding reactive group on the amino compound necessary to form the ester, amide, or imide linkage. The coupler desirably has a molecular weight of less than 4000, more desirably less than 2000 and preferably less than 1000. While the reaction product generally comprises the reaction of one or two amino compounds and one second compound, it can be an oligomer or polymer with multiple amino compounds and second compounds therein.

The amino compound can have a variety of structures as long as it has at least one amino group and at least one of the other groups specified above. The amino compound can be highly branched, contain a cycloaliphatic group, or even an aromatic group. Preferred amino compounds will have low molecular weight and at least the two specified reactive groups. For example, it may the following structure:

$$R_2N-(CR_2)_b-Z(H) \text{ or } R_2N-(CR_2)_b-(C=O)OR \quad \text{Formula 1}$$

where b is, independently, an integer from 1 to 6.

Z is NH, NR, or O, and R is independently in each occurrence H, lower alkyl (C1–C4), or a linear, branched, or cyclic amine with 1 to 8 nitrogen atoms and 1 to 16 carbon atoms. By R independently being various groups and b varying from 1 to 6, in this formula and subsequent formulas, $(CR_2)_b$ can include various branched structures with the branching occurring on any of the first to sixth carbon atoms. Preferably $(CR_2)$ is $CH_2$. Similarly $(CR_2)_a$ can have branching on the first to fourth carbon atoms.

Another amino compound would be the above formula where an aromatic or alkyl substituted aromatic group of 6 to 15 carbon atoms is substituted for one of more of the $(CR_2)_b$ linkages. It is to be noted that amino compounds can have more complicated structures where branched or cycloaliphatic structures exist between the amine group and the second reactive group of the amino compound. Preferred amino compounds include ethylenediamine, diethylenetriamine, triethylenetetraamine, and tetraethylenepentamine (including isomers thereof). Amino compounds with more than two nitrogen atoms are preferred due to the fact that multiple amine reactive sites further the probability of an amine reacting with an acid site on the carbon black. Compounds with a number of (nitrogen containing) functional groups are also preferred because these functional groups may react with several sites on the carbon black surface, and this can provide strong anchoring even if the interactions are weak. Preferred amine compounds will have molecular weights from about 50 to about 500 and from 1 to about 10 amine groups and preferably from about 1 to about 6 amine groups.

The second compound used to form the amine coupler can have a variety of structures as long as it has the necessary polysulfidic or thiol group and a reactive group that could react with the functional group(s) on the amino compound. The second compound can include internal branching, amide linkages, ether linkages, ester linkages etc. The second compound can include cycloaliphatic groups and aromatic groups. In preferred embodiments the second compound has a simple low molecular weight structure such as shown below:

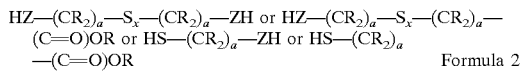

$HZ-(CR_2)_a-S_x-(CR_2)_a-ZH$ or $HZ-(CR_2)_a-S_x-(CR_2)_a-(C=O)OR$ or $HS-(CR_2)_a-ZH$ or $HS-(CR_2)_a-(C=O)OR$     Formula 2 where x is, on average, from 1 to 8,
a is independently at each location an integer from 1 to 4,
Z is NH, NR, or O and R is independently in each occurrence H, lower alkyl (C1–C4), or a linear, branched, or cyclic amine with 1 to 8 nitrogen atoms and 1 to 16 carbon atoms.

Alternatively the second compound could be the above formula where an aromatic or alkyl substituted aromatic group of 6 to 15 carbon atoms is substituted for one or more of the $(CR_2)_a$ connecting groups. Desirably the second compound has a number average molecular weight from about 50 to about 500 and preferably from about 50 to about 200. The reaction product of Formula 1 and 2 can, optionally, be further reacted with elemental sulfur.

Therefore the amino coupler can have a variety of structures including but not limited to those shown below:

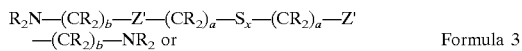

$R_2N-(CR_2)_b-Z'-(CR_2)_a-S_x-(CR_2)_a-Z'-(CR_2)_b-NR_2$ or     Formula 3

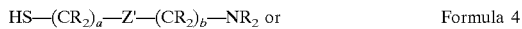

$HS-(CR_2)_a-Z'-(CR_2)_b-NR_2$ or     Formula 4

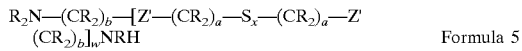

$R_2N-(CR_2)_b-[Z'-(CR_2)_a-S_x-(CR_2)_a-Z'-(CR_2)_b]_w-NRH$     Formula 5 where x is on average, from 1 to 8,
a is independently at each location an integer from 1 to 4
b is independently at each location an integer from 0 to 6
w is independently an integer from 1 to 100
Z' is $-C(O)-N(H)-$, $-C(O)-N(R)-$, $-N(H)-C(O)-$, $-N(R)-C(O)-$, $-C(O)-O-$, or $-O-C(O)-$
where $-C(O)-$ means a carbon with a pendant $=O$
R is independently in each occurrence H, lower alkyl (C1–C4), a linear, branched, or cyclic amine with 1 to 8 nitrogen atoms and 1 to 16 carbon atoms.

Alternatively the coupler could be any of the above formulas where an aromatic or a mono, di, or poly alkyl substituted aromatic is substituted for one or more of the $(CH_2)_a$ or $(CH_2)_b$ connecting groups, and each alkyl of the alkyl substituted aromatic has from 1 to 5 carbon atoms. The coupler and carbon black are useful in a variety of rubber compositions. Articles from the compositions include but are not limited to tires, tire treads, conveyor or drive belts, and roller coatings. Tires are a preferred application for rubber compositions using the coupler and carbon black.

Tires are generally pneumatic, meaning that they are adapted for holding or being inflated with air or other fluid. Tires generally include but are not limited to radial and bias ply tires for trucks, cars, aircraft, farm applications, and construction vehicles.

The coupler will desirably impart improved properties to the rubber composition due to better dispersion of the carbon black, easier or quicker dispersion of the carbon black, or better carbon black interaction with the rubber of the rubber composition. This improved interaction between the carbon black filler and the rubber can improve a variety of physical and mechanical properties of the rubber composition or article including but not limited to wear, fracture strength, and hysteretic properties.

In the case where the coupler is a reaction product of the amino compound and the second compound, these two components are reacted under controlled conditions to form the desired product (possibly of formula 3, 4, or 5). That reaction product is then mixed with the carbon black, possibly in the presence of the rubber or in the absence of the rubber. Thus the coupler can be dissolved or dispersed in a fluid and added to the carbon black anytime before crosslinking the rubber, e.g. including in a separate step before the carbon black is added to the rubber. If a volatile fluid is used to add the coupler to the carbon black it may be desirable to evaporate the fluid before the carbon black and coupler are added to the rubber and other components of the rubber composition. It is also possible to add the coupler in a mixing step where the carbon and rubber are both present. Higher temperatures and longer reaction times promote a reaction between the surface of the carbon black and the amine group of the coupler.

The rubbers of particular interest in this application are rubbers or elastomers containing at least some olefinic unsaturation. Desirably at least 30 phr of the rubber(s) have at least 30 weight percent repeating units derived from polymerizing at least one conjugated diene monomer. Examples of such rubber(s) include natural rubber (which for the purpose of this specification will be defined as being derived from the polymerization of at least one conjugated diene i.e. isoprene), homopolymers of conjugated diene monomers such as polybutadiene, copolymers from conjugated diene monomers such as styrene-butadiene rubber, terpolymers and polymers from polymerizing four or more different monomers, said rubber(s) having at least 30 weight percent of repeating units derived from polymerizing conjugated dienes. Conjugated dienes are dienes where the unsaturation is conjugated such as in butadiene or isoprene. More desirably the rubber composition has at least 50 or 75 phr of said rubber derived from polymerizing said at least one conjugated diene monomer and one or more other monomers. Desirably said rubber has at least 40 or 50 weight percent of said repeating units derived from polymerizing said at least one conjugated diene monomer. U.S. Pat. No. 5,698,619 herein incorporated by reference teaches several specialized olefinic rubbers that are useful in some tire applications. Phr is defined as parts by weight per one hundred parts by weight total rubber in a composition.

Other rubbers conventionally used in tires (e.g. without or with less repeating units from polymerizing one or more conjugated diene monomers) may be present. They may constitute the residual of the rubber in the rubber composition. These rubbers include but are not limited to the butyl rubbers, halobutyl rubber, isobutylene copolymers with brominated paramethylstyrene, ethylene-propylene-diene monomer (EPDM) systems, etc. These other rubbers may be crosslinked with other crosslinking agents that are effective to vulcanize rubbers without olefinic unsaturation, for example, peroxide cure.

Carbon black filler is generally any of the conventional carbon blacks sold for reinforcing rubber. The amount of carbon black, based on 100 parts by weight of total rubber (phr), is desirably at least 20 phr, more desirably from about 25 phr to about 150 phr, preferably from about 30 to about 90 or 120 phr. The carbon black desirably has a surface area as determined by ASTM D3037 (Nitrogen Specific Surface Area) of from about 30 to about 250 $m^2/g$ and more desirably from about 100 to about 250 $m^2/g$. In some embodiments requiring a significant improvement in tan delta at 60° C., the carbon black desirably has from about $10^{-3}$ to about 10 acid groups/square nanometer of surface area and more desirably from about $10^{-2}$ to about 5 acid groups per square nanometer of surface area as determined by calcium acetate extraction of the carbon black followed by sodium hydroxide titration. This method of titration measures the strong acid sites, and these are the important sites for bonding of the coupler with the carbon black. In practice the titration procedure uses 10 grams of dry carbon black, and refluxes this with 100 mL of 6.3 g/L calcium acetate on a hot plate for 24 hours. This mixture is allowed to cool, and it is washed into a 250 mL volumetric flask, filled to the mark and mixed. After allowing the carbon black to settle, 50 mL portions are pipetted into a flask, a few drops of phenolphthalein indicator are added, and the solution is titrated with 0.1 N sodium hydroxide to a pink end point. Each titration is run with a blank standard; after subtracting the blank, the equivalents of strong acid are calculated.

In using this method any additives to the carbon black (such as lignosulfonate binder that may contain titratable acid groups) needs to be removed or compensated for in the test method. The carbon black can be one of the commercially available carbon blacks or it can be a carbon black modified to have higher amounts of polar groups such as hydroxyls, carboxyls, and carbonyl groups (including phenolic, keto and aldehyde moieties). These higher amounts of polar groups can be achieved by various oxidation treatments such as with air, hydrogen peroxide or ozone (such as described in U.S. Pat. No. 5,723,531) or by treatment with nitric acid. Higher surface area carbon blacks are preferred as they tend to give rubber compositions with higher modulus, higher ultimate tensile strength, and improved abrasion resistance when compared to compositions made from lower surface carbon blacks. Surface area is related to internal porosity of the carbon black and the particle size of the carbon black.

Carbon black has a variety of particle sizes that can be characterized. One particle size characterization that is typically used in practice is the ultimate particle size that represents the average smallest units of carbon black present in a particle or agglomerate. Commercial carbon blacks have calculated average particle diameters from about 20 to about 90 nanometers. Actually, carbon black is composed of groups of spheroidal particles aggregated or fused (covalently bonded) together. These spheroidal particles range in size (principal diameter) from a few nanometers to tens of nanometers, and the aggregate sizes range from 20 to several hundred nanometers. These sizes, and the overall particle morphology, are important in determining their effect on the properties of a carbon black reinforced rubber composition. Many of these ultimate particles are so interfused that conventional rubber mixing processes cannot separate them, characterized by a structure which is referred to as an "aggregate" form. Aggregates can clump together, held by weak forces, to form an agglomerate form. When bulk carbon black is examined it includes many large agglomerates that are easily dispersed during rubber mixing. Non-dispersed carbon black agglomerates larger than a few microns in size tend to act as defects in the final composition and may serve to nucleate failures by allowing stress localization within the polymeric composition.

Silica may be present in small amounts such as less than 50 or 20 phr. In some applications the precipitated silica reacts with one or more silanes and is a competitive filler to carbon black in terms of providing a tough rubber composition with low rolling resistance for tire applications. In some embodiments the composition is substantially free of silica. For the purpose of this application "substantially free of silica" is defined as less that 5 phr and preferably less than 1 or 0.5 phr.

A curative (also known as crosslinker or vulcanizer) will generally be present in the rubber composition to cause the rubber to crosslink. Generally the curative will include a sulfur-containing compound, although in some circumstances it can be one of the nonsulfidic materials known to crosslink unsaturated rubbers. Sulfur is typically used in amounts from about 0.5 to about 8 phr, but more desirably from about 1.5 to 6 phr. The curative can be a combination of sulfur and one or more appropriate cure accelerators. Cure accelerators include but are not limited to amines, guanidines, thioureas, thiazoles, thiurams, sulfenamides, dithiocarbamates, and xanthates. Preferred accelerators are sulfenamides. Such curatives are well known to those familiar with the art. The rubber composition may also include compounds known as retarders or scorch inhibitors. These extend the time the rubber can be mixed warm while retarding the crosslinking process. Vulcanization is generally carried out at temperatures from 100 to 200° C. preferably from 110 to 180° C. in a press or mold. Often superheated steam or other heat transfer fluid is used to heat the mold or press.

The rubber composition may include other additives. Additives commonly used in tire formulations include lubricants (e.g. zinc stearate) and antioxidants (phenolics, hydroquinones, phosphites or aromatic amines). The additives are typically individually used in amounts from 1 to 5 phr and include antiozonants (typically used from 1–5 phr), zinc oxide (1–5 phr), fatty acids such as stearic acid (0.5–3 phr), oils (typically used in large amounts), processing aids, resins, tackifiers (typically used from about 0.5 to 10 phr and more desirably 1 to 5 phr), plasticizers, pigments, waxes (including microcrystalline waxes), and peptizing agents. All of these are known to those skilled in the art as well as their effective or conventional use amounts. These types and concentrations are disclosed in detail in standard references such as the Vanderbilt Rubber Handbook. Desirably the amount of oil, when present, is from about 10 to about 250 phr. Tackifiers give the rubber composition improved green (uncured) adhesion to other rubber compositions. Green adhesion facilitates the adherence of the various rubber components of the tire to each other during the manufacturing of the green tire. The amount of coupler studied was from about 0.5 to 8 or 12 phr, based on using a carbon black with a nominal surface area of 125 $m^2/g$. Higher amounts may be used, but the preferred range seems to be about 1 or 3 to about 6 phr. If the coupler is to be pretreated on the carbon black, desirable the amount of coupler is at least 0.2 parts by weight per 100 parts by weight of carbon black and more desirably from about 0.4 to about 10 or 15 parts by weight of coupler per 100 parts by weight of carbon black.

The rubber composition can be formulated with multiple mixing steps as is well known to the art. Rubber mixing equipment is well known and includes multiple roll mills and various internal mixers such as Banbury or Brabender mixers. Mixing is normally conducted in at least two stages to minimize heat buildup in the rubber composition, a major cause of premature curing. The final curatives are normally added in the final or productive mix stage where the mix temperature is kept low to minimize polymer crosslinking prior to molding the rubber into a final shape. Peptizing agents may be used during mixing to modify the flow behavior of the rubber during mixing or subsequent processing steps. Usually the carbon black and a few of the other hard to disperse components are mixed with the rubber in a first mixing step called a "non-productive mixing step(s)" while the curatives (crosslinkers for the rubber) are not all present. This offers an opportunity for higher temperature mixing with less concerns about premature crosslinking. The rubber composition from this step can be removed from the mixer and cooled and that composition can be mixed with other additives in one or more further mixing steps. A final mixing step for adding and dispersing curatives, usually called a "productive mixing step", is conducted with the curatives present. Some degree of care is required to ensure that the mix temperature, with the curatives present, is low enough to preclude any significant crosslinking of the rubber composition during the mixing steps.

Hysteresis is a common phenomenon with rubber components. Hysteresis indicates that the deformation process follows a loop rather than a reversible path. The loop indicates a loss of resilient energy during deformation of a rubber article. This loss of energy has been associated with rolling resistance. Hysteresis is +- dependent on the temperature and the deformation frequency of the test measurement. For cyclic deformation hysteresis relates to the difference between the energy applied to deform the sample and the energy recovered when the sample regains its initial undeformed state. The difference is the energy lost as heat. A composition with high hysteresis is known to have low rebound and low resilience. Hysteresis is characterized by a loss tangent or tan delta, which is a ratio of the loss modulus to the storage modulus (that is, the viscous modulus to elastic modulus) in either shear or tension. Generally tires made with a tread compound having a low hysteresis as measured at 40 to 80° C. will have reduced rolling resistance, which in turn, generally results in reduced fuel consumption by a vehicle using the tire. At the same time, a tire having a tread with a higher hysteresis value measured at a low temperature, such as 0° C. will generally result in a tire with high wet traction and good skid resistance. An increase in value of wet traction and skid resistance is associated with an increase in driving safety. The tire with higher hysteresis at 0° C. (which correlates to higher wet skid traction) and lower hysteresis at 60° C. (which correlates to lower roll resistance) is said to have a good hysteresis balance. An easy way to compare the rolling resistance to the wet traction is the inversion ratio (inv. ratio) used in the following examples. The inversion ratio is the tan $\delta$ at 0° C. divided by the tan $\delta$ at 60° C. A high inversion ratio indicates a composition that would be predicted to give both good wet traction and low rolling resistance.

A variety of test methods exist for measuring the tan delta for cured (crosslinked) rubber samples. Tire manufacturers generally attempt to maximize the tan delta at 0° C. while minimizing the tan delta at 60° C. Other properties needed in tires are abrasion resistance, high hardness, acceptable modulus, and both tear and cut resistance. Many physical properties of a cured rubber article can be controlled by crosslink density and type of rubber. A prime concern in optimizing hysteretic properties at specific temperatures, however, is the interaction between the rubber and the filler at their interfaces. Typically high surface area fillers increase hysteretic losses since they increase the amount of rubber-to-filler interfacial area. Coupling agents offer an opportunity to reduce rolling resistance while retaining wet traction of a tread composition by chemically bonding the filler to the rubber, thus lowering the energy consuming interaction at the filler surface and the hysteresis of the rubber.

EXAMPLES

The examples below illustrate that a coupler for carbon black can both decrease the tan delta value at 60° C. and substantially maintain the tan delta value measured at 0° C. Thus it should be possible to prepare rubber compositions with reduced rolling resistance and good wet traction properties. These tan delta determinations were conducted on crosslinked samples using an MTS 831 Elastomer Test System and MTS 651 Environmental Chamber, using a double strain amplitude of 5% at 10 Hz at temperatures of 0, 20, 40, and 60° C. The specimen is a right cylinder, 0.5 inches high and 1.5 inches in diameter.

The following general mixing procedure (Scheme 1) was used to prepare Examples 1–8 in Tables 2 through 5. The rubber compositions mixed with this procedure are Formulas A and B of Table 1.

Scheme 1 Mixing

First Pass Mixing—Banbury (Stage 1)
    Run 77 or 116 rpm with cooling
    0–1' Add all polymer
    1–2' Add one-half of the filler, all of the coupler, ½ of the oil, and Flexzone
    2–3' Add remaining filler and oil
    3–4' Sweep down the RAM
    4' Drop the Stage 1 batch at 320 F.
    Sheet batch out on a 2-roll mill, and cool at least 4 hours
Second Pass Mixing—Banbury (Stage 2)
    Run 77–116 rpm
    0–1' Add batch from Stage 1
    3' Drop the Stage 2 batch at 300° F.
    Sheet out on a 2-roll mill and allow to set overnight
Final Pass (Open Mill)
    Load Stage 2 batch on cool, 2-roll mill
    0.5' Add sulfur, CBS, ZnO and stearic acid
    Cut at least 5 times from each side
    Drop, sheet out to cool
All mix times (indicated by a value ') are in minutes The following couplers were used in these examples 1 through 30.

Coupler A $H_2N-(CH_2)_2-(H)N(C=O)-(CH_2)_2-S_4-(CH_2)_2-(C=O)N(H)-(CH_2)_2-NH_2$
Coupler B $H_2N-(CH_2)_2-(H)N(C=O)-(CH_2)_2-S_2-(CH_2)_2-(C=O)N(H)-(CH_2)_2-NH_2$
Coupler C $H_2N-(CH_2)_2-(H)N(C=O)-(CH_2)_2-S_3-(CH_2)_2-(C=O)N(H)-(CH_2)_2-NH_2$ The number of sulfur atoms indicated in the above structures corresponds to an integer closest to the average number in the distribution.

TABLE 1

Rubber Formulations A and B

| Component | Formula A | Formula B |
| --- | --- | --- |
| Coupler | 0–8.0 | 1.0–12.8 |
| High cis polybutadiene[1] | 30.0 | 30.0 |
| Solution styrene butadiene rubber[2] | 70.0 | 70.0 |
| Flexzone 7P[3] antioxidant | 1.0 | 1.0. |
| Stearic Acid | 2.0 | 2.0 |
| Zinc Oxide | 3.0 | 3.0 |
| Carbon black; N-234 | 80.0. | 0 |
| Silica - Zeopol 8745 (Huber) | 0 | 80.0 |
| Aromatic oil | 36.0 | 36.0 |
| Sulfur | 1.5 | 1.5 |
| CBS[4] vulcanization accelerators | 1.5 | 1.5 |
| Diphenyl guanidine | 0 | 2.0 |

[1]Duradene 715 from Firestone Polymers
[2]Budene 1207 from Goodyear
[3]N-(1,3 dimethyl butyl)-N'-phenylenediamine from Uniroyal Chemical
[4]Cyclohexyl benzothiazole sulfenamide
Examples 1–8 are rubber compositions according to Formulas A and B in Table 1, which have been crosslinked and tested.

TABLE 2

Results for Examples 1–8 after mixing and crosslinking

| Example | Coupler | Formula | Phr coupler | Tan δ 0° C. | Tan δ 60° C. | Inv. Ratio | DIN index/loss |
| --- | --- | --- | --- | --- | --- | --- | --- |
| 1 (comp) | None | A | 0 | 0.380 | 0.252 | 1.51 | 100/0.193 |
| 2 (comp) | None | A | 0 | 0.377 | 0.252 | 1.49 | 92.6 |
| 3 | A | A | 0.5 | 0.353 | 0.242 | 1.46 | |
| 4 | A | A | 1.0 | 0.330 | 0.219 | 1.51 | 92/0.086 |
| 5 | A | A | 1.5 | 0.338 | 0.209 | 1.62 | |
| 6 | A | A | 2.0 | 0.332 | 0.204 | 1.63 | 95/0.089 |
| 7 (comp) | X50-S* | B | 12.8 | 0.251 | 0.136 | 1.85 | 104/0.098 |
| 8 (comp) | A | B | 1.0 | 0.250 | 0.162 | 1.54 | 128/0.12 |

*50:50 Bis-triethoxylpropylsilyl polysulfide on carbon black carrier from Degussa Desired results:
Inversion ratio (tan δ @0° C./tan δ @60° C.) is high
DIN index and DIN volume are low Examples 1 and 2 were control (comparative) samples without a coupler and served to illustrate both the tan δ values in the absence of a coupler and the variation between substantially identical samples. Examples 3–6 illustrate that the inversion ratio increases as the amount of coupler used increases. Example 7 (comparative) illustrated that much higher amounts of a commercial coupler (bis-triethoxylpropylsilyl polysulfide on carbon black carrier) can increase the inversion ratio but cannot decrease the DIN index/loss. Example 8 (comp) illustrates that the use of Formula B, which lacks carbon black, does not have the desired inversion ratio and results in a composition with a higher DIN index/loss.

Examples 9–18 were prepared with the same formulations (A and B) and procedures as Examples 1–8, except that either N234 or EC292 (a high hysteresis version of N234) carbon black were used and the incorporation of any coupler was by pre-treatment of carbon black instead of adding coupler directly to the mix in the first pass as set forth in mixing Scheme 1. The pre-treatment of examples 9–18 involved application of an aqueous solution of coupler onto the carbon black and evaporation of the water.

TABLE 3

Results for Examples 9–18

| Example | Coupler/ Carbon Black | Phr coupler | Formula | Tan δ 0° C. | Tan δ 60° C. | Inv Ratio | DIN index/ loss |
| --- | --- | --- | --- | --- | --- | --- | --- |
| 9 (comp) | None/EC292 | 0 | A | 0.366 | 0.254 | 1.44 | 96.9 |
| 10 (comp) | None/N234 | 0 | A | 0.377 | 0.252 | 1.49 | 92.6 |
| 11 | A/N234 | 0.5 | A | 0.356 | 0.244 | 1.45 | |
| 12 | A/EC292 | 4.0 | A | 0.346 | 0.212 | 1.63 | 94.7 |
| 13 | B/N234 | 2.0 | A | 0.348 | 0.235 | 1.48 | 94.2 |
| 14 | B/N234 | 4.0 | A | 0.329 | 0.209 | 1.57 | 87.8 |
| 15 | B/N234 | 8.0 | A | 0.326 | 0.245 | 1.33 | 70.5 |
| 16 | C/N234 | 2.0 | A | 0.256 | 0.221 | 1.61 | 101.0 |
| 17 | C/N234 | 4.0 | A | 0.346 | 0.224 | 1.55 | 101.2 |
| 18 | C/N234 | 8.0 | A | 0.331 | 0.242 | 1.36 | 101.8 |

The Examples 9 and 10 (comp) of Table 3 illustrate that the particular carbon black used, without a coupler, does not significantly impact the inversion ratio. Examples 11 and 12 illustrate some variation may be achieved by varying both the carbon black type and the amount of coupler. Examples 13–15 illustrate variations in inversion ratio and DIN index/loss with the amount of a coupler while Examples 16–18 illustrate other variations with amount of a different coupler under otherwise identical conditions.

Table 4 shows test results for Examples 19–20 which were prepared according to the procedures and recipes of Table 2, except that the coupler was added at a level of 0.8 phr by using 8 phr of a 10% aqueous solution of coupler.

TABLE 4

Test Results Samples 19–20

| Example | Coupler/ C black | Phr coupler | Formula | Tan δ 0° C. | Tan δ 60° C. | Inv Ratio | DIN index/loss |
| --- | --- | --- | --- | --- | --- | --- | --- |
| 19 (comp) | None | 0 | A | 0.382 | 0.296 | 1.29 | 100 |
| 20 | A | 0.8 | A | 0.360 | 0.233 | 1.54 | |

Table 5 shows the effect of using oxidized N234 carbon black on the inversion ratio of samples with and without coupler. The formulation and procedures are similar to Examples 9–18 using Formula A.

TABLE 5

Test Results Samples 21–27

| Example | Coupler | Phr coupler | Oxidant | Tan δ 0° C. | Tan δ 60° C. | Inv Ratio | DIN index/ loss |
| --- | --- | --- | --- | --- | --- | --- | --- |
| 21 (comp for 22) | None | 0 | HNO$_3$ | 0.370 | 0.269 | 1.38 | 100.9 |
| 22 | A | 4.0 | HNO$_3$ | 0.314 | 1.172 | 1.82 | 95.4 |
| 23 (comp for 24) | None | 0 | Air-1st | 0.401 | 0.320 | 1.25 | 121.0 |
| 24 | A | 4.0 | Air- 1st | 0.362 | 0.217 | 1.67 | 124 |
| 25 (comp for 27) | A | 0 | None | 0.361 | 0.289 | 1.25 | 107.2 |
| 26 (comp for 27) | A | 0 | Air-2nd | 0.363 | 0.296 | 1.22 | 114.2 |
| 27 | A | 4.0 | Air-2nd | 0.299 | 0.211 | 1.42 | 122.2 |

The oxidized N-234 carbon black had the following properties:

|  | ave meq CO$_2$/g* | SA, m2/g | ave CO$_2$ sites/nm2 |
|---|---|---|---|
| N-234 | 0.0121 | 120 | 0.0603 |
| Air oxidized N-234 1$^{st}$ | 0.0441 | 134 | 0.200 |
| Air oxidized N-234 2$^{nd}$ | 0.0194 | 130 | 0.090 |

*% strong acid sites (by CaOAc extraction /NaOH titration)

TABLE 6

Examples 28–35 Similarly Prepared Table 5, Except the Coupler Was Added as a Dry Mix.

| Example | Coupler | Phr coupler | Oxidant | Tan δ 0° C. | Tan δ 60° C. | Inv. Ratio | DIN index/loss |
|---|---|---|---|---|---|---|---|
| 28 (comp for 30,31) | None | 0 | None | 0.370 | 0.270 | 1.37 | 105.4 |
| 29 (comp for 30,31) | None | 0 | Air- 2$^{nd}$ | 0.384 | 0.293 | 1.31 | 105.7 |
| 30 | A | 4.0 | Air- 2$^{nd}$ | 0.362 | 0.236 | 1.53 | 110.2 |
| 31 | A | 4.0 | Air- 2$^{nd}$ | 0.361 | 0.230 | 1.57 | 100.7 |
| 32 (comp for 34,35) | None | 0 | None | 0.379 | 0.280 | 1.36 | 110.6 |
| 33 (comp for 34,35) | None | 0 | Air- 2$^{nd}$ | 0.343 | 0.302 | 1.14 | 123.7 |
| 34 | A | 4.0 | Air- 2$^{nd}$ | 0.385 | 0.245 | 1.57 | 118.7 |
| 35 | Si-69/w CB-SiO2 | (Commercial Tire Tread) |  | 0.355 | 0.205 | 1.73 | 100.3 |

Table 7 shows the same formulation and procedures as Examples 1–8 except varying Formula A and mixing Scheme I by splitting the addition of coupler into the mix into two equal portions.

TABLE 7

Test Results Examples 36–38

| Example | Coupler/ C black | Phr coupler | Split Addition | Tan δ 0° C. | Tan δ 60° C. | Inv Ratio | DIN index/loss |
|---|---|---|---|---|---|---|---|
| 36 (comp) | None | 0 | N/A | 0.387 | 0.261 | 1.48 | 51/0.0466 |
| 37 | A | 2.0 | No | 0.337 | 0.247 | 1.53 | 66/0.0602 |
| 38 | A | 2.0 | Yes | 0.383 | 0.261 | 1.56 | 47/0.0428 |

A rubber mix of the formulation shown below in Table 8 was mixed according to the procedure described in Scheme 2. Test results are tabulated in Tables 9 and 10.

TABLE 8

Recipe for Formula C

| Component | Formula C |
|---|---|
| Coupler | 0–4.0 |
| High cis polybutadiene[5] | 30.0 |
| High styrene emulsion SBR[6] | 96.25 |
| Flexzone[7] F | 1.0 |
| Stearic Acid | 2.0 |
| Zinc Oxide | 1.8–3 |
| Carbon black, N-234 | 80.0 |
| Aromatic oil | 10 |
| Sulfur* | 0.9–1.5 |
| CBS[8] vulcanization accelerators | 0.9–1.5 |

*Curative package was adjusted to correct for active sulfur in the coupler
[5]Budene 1207 from Goodyear
[6]SBR 1721, Ameripol Synpol
[7]N-(1,3 dimethyl butyl)-N'-phenylenediamine from Uniroyal Chemical
[8]Cyclohexyl benzothiazole sulfenamide Mixing Procedure for Formula C (Scheme 2 Mixing)

First Pass Mixing—Banbury (Stage 1)

Run 77 to 116 rpm with cooling

| 0–1' | Add all polymer and antioxidant |
|---|---|
| 1–2' | Add one-half of the filler, all of the coupler, one-half of the oil |
| 2–3' | Add remaining filler and rest of oil |
| 4' 250° F. | Add stearic acid and sweep |
| 270–280° F. | Drop, sheet out to cool |

Final Pass (Open Mill)

Load Stage 1 mix on cool mill 0.5' Add sulfur, CBS, ZnO

Cut at least 5 times from each side

Drop, sheet out to cool

All mix times are in minutes (')

Coupler pre-adsorbed on a small amount of carbon black

Table 9 shows the effect of the carbon black coupler with an oil-extended emulsion SBR composition, which differs from the previous examples.

TABLE 9

Results for Formula C and Examples 39–44 (CB = N234 carbon black)

| Example | Coupler/ filler | Phr coupler | Formula | Tan δ 0° C. | Tan δ 60° C. | Inv Ratio | DIN index/loss |
|---|---|---|---|---|---|---|---|
| 39 (comp for 40,41) | None/CB | 0 | C | 0.448 | 0.271 | 1.65 | 84.6/0.077 |
| 40 | A/CB | 3 | C | 0.431 | 0.250 | 1.72 | 70.5/0.064 |
| 41 | A/CB | 4 | C | 0.444 | 0.265 | 1.68 | 74.8/0.068 |
| 42 (comp for 43,44) | None/CB | 0 | C | 0.405 | 0.302 | 1.34 | 108 |
| 43 | A/CB | 4 | C | 0.362 | 0.229 | 1.58 | 124 |
| 44 | Si-69/ CB-SiO2 |  | Commercial Tire Tread | 0.378 | 0.228 | 1.64 | 100 |

Table 10 shows the expected effect of the measured tan δ (delta) values and DIN index on the performance in a tire application where the values were determined by setting the control (Example 39) equal to 100. Higher values in inversion ratio and lower numbers in DIN index are improvements in wet skid resistance/rolling resistance and abrasion resistance, respectively.

TABLE 10

Expected Performance Indexes Based on Test Results.

| Performance | Control (Example 39) | 3 PHR (Ex 40) | 4 PHR (Ex. 41) |
|---|---|---|---|
| Rolling Resistance | 100 | 108 | 100 |
| Wet Skid | 100 | 96 | 99 |
| DIN Abrasion | 100 | 117 | 112 |

Experiments were also carried out with various compounds that included polysulfidic linkages and terminal amine or hydroxyl groups to help determine the beneficial components to a coupling agent for carbon black and rubber. A reaction between various oleyl molecules with sulfur would be expected to couple the oleyl molecules with mono or polysulfidic linkages near the site of the original double bond creating a molecule with internal polysulfidic linkages and terminal hydroxyl or amino groups.

TABLE 11

Various Sulfurized Oleyl Groups with Carbon Black Formulated in Rubber Compounds

| Coupler | Tan δ 0° C. | Tan δ 60° C. | Inv. Ratio |
|---|---|---|---|
| Coupler D | 0.2450 | 0.1630 | 1.503 |
| Coupler E | 0.2590 | 0.1950 | 1.328 |
| Coupler F | 0.2540 | 0.1840 | 1.380 |

Coupler D amide of ethylene diamine and oleic acid reacted with sulfur
Coupler E glycerol monoleate reacted with sulfur
Coupler F N-(oleylamino)propylamine reacted with sulfur The data above were prepared with similar but not identical procedures to the evaluation of the other couplers A, B, and C in rubber compositions. The point to be gathered from Table 11 is that couplers with terminal amino groups and an internal amide linkage (Coupler D), appeared to perform better as a coupler than almost identical couplers; (Coupler F) that had the amine terminal group but lacked the internal amide linkage and (Coupler E) that lacked both the internal amide linkage and the terminal amine group.

In ranges specified in this application the term about value 1 to value 2 is meant to imply that the "about" term modifies both the value 1 and value 2 (e.g. about value 1 to about value 2).

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A rubber composition comprising:
   a) at least 30 parts per hundred rubber (phr) of a rubber having at least 30 weight percent of repeating units derived from polymerizing one or more conjugated diene monomers;
   b) at least 20 phr of a carbon black, or combination of carbon black with another filler such as silica, or clay, and
   c) at least about 0.5 phr of a coupler for said carbon black, said coupler having at least 1) an amine group, 2) a carbonyl group, and 3) either a thiol group or a mono, di or polysulfidic linkage,
   wherein said coupler is the reaction product of at least one amino compound and at least a second compound, said second compound having both a thiol or polysulfidic linkage and another group which can couple through a condensation reaction with said amino compound forming an ester or amide linkage, and optionally said reaction product further reacted with elemental sulfur to form additional polysulfiddic linkages.

2. The rubber composition of claim 1, where the amino compound includes tetraethylenepentamine (mixed isomers).

3. The rubber composition of claim 1, wherein said coupler is a reaction product of at least one amino compound and a second compound, said second compound having a thiol group and at least one functional group reactive with an amino group, and said reaction product being subsequently reacted with elemental sulfur.

4. The rubber composition of claim 1, wherein said coupler is a reaction product of reacting ethylenediamine and a second compound, said second compound being the methyl ester of 3-mercaptoproprionic acid, and subsequently reacting with sulfur.

5. The rubber composition of claim 1, wherein said coupler is represented by the formula

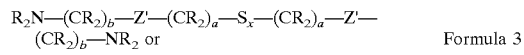 Formula 3

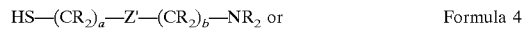 Formula 4

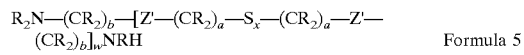 Formula 5 where x is on average, from 1 to 8,
a is independently at each location an integer from 1 to 4
b is independently at each location an integer from 0 to 6
w is independently an integer from 1 to 100
Z' is —C(O)—N(H)—, —C(O)—N(R)—, —N(H)—C(O)—, —N(R)—C(O)—, —C(O)—O—, or —O—C(O)— where C(O) is a C with a pendant =O
R is independently in each occurrence H, lower alkyl (C1–C4), or a linear, branched, or cyclic amine with 1 to 8 nitrogen atoms and 1 to 16 carbon atoms.

6. The rubber composition of claim 5, wherein said coupler is represented by formula 3 or 4.

7. The rubber composition of claim 6, wherein Z' at each occurrence is —C(O)—N(H)—, —N(H)—C(O)—, —C(O)—N(R)—, or —N(R)—C(O)—.

8. The rubber composition of claim 7, wherein said coupler is represented by Formula 3, wherein a is 2, R is H, b is 2, and x is on average a number between 1 and 4.

9. The rubber composition of claim 7, wherein said coupler is represented by

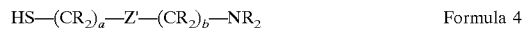 Formula 4 wherein a is 2, R is H, and b is 2.

10. The rubber composition of claim 5, wherein said coupler is represented by Formula 5, each Z' is a —C(O)—N(H)—, —N(H)—C(O)—, —C(O)—N(R)—, or —N(R)—C(O)—, and wherein a is 2, R is H, b is 2 and x is on average a number between 1 and 4.

11. The rubber composition of claim 8, wherein the amount of coupler is from about 0.5 to about 8 phr.

12. The rubber composition of claim 11, wherein the composition is substantially free of precipitated silica.

13. The rubber composition of claim 11, wherein said carbon black has been oxidized to increase the amount of polar groups on the surface.

14. The rubber composition of claim 11, wherein said carbon black has from about 0.01 to about 10 acid groups per square nanometer of surface area as determined by calcium acetate extraction/sodium hydroxide titration.

15. The rubber composition of claim 11, wherein said carbon black has from about 0.05 to about 5 acid groups per square nanometer of surface area as determined by calcium acetate extraction/sodium hydroxide titration.

16. The rubber composition of claim 11, wherein said rubber composition is formed into the shape of a tread for a pneumatic tire and has been crosslinked.

17. The rubber composition of claim 11, further including from about 0.5 to about 10 phr of a tackifier.

18. The rubber composition of claim 11, further including from about 10 to about 250 phr of an extender oil.

19. A modified carbon black according to claim 1, wherein said coupler is represented by the formula $$R_2N-(CR_2)_b-Z'-(CR_2)_a-S_x-(CR_2)_a-Z'-(CR_2)_b-NR_2 \text{ or} \quad \text{Formula 3}$$

$$HS-(CR_2)_a-Z'-(CR_2)_b-NR_2 \text{ or} \quad \text{Formula 4}$$

$$R_2N-(CR_2)_b-[Z'-(CR_2)_a-S_x-(CR_2)_a-Z'-(CR_2)_b]_w NRH \quad \text{Formula 5}$$

where x is on average, from 1 to 8,
a is independently at each location an integer from 1 to 4
b is independently at each location an integer from 0 to 6
w is independently an integer from 1 to 100

Z' is —C(O)—N(H)—, —C(O)—N(R)—, —N(H)—C(O)—, —N(R)—C(O)—, —C(O)—O—, or —O—C(O)— where C(O) is a C with a pendant =O R is independently in each occurrence H, lower alkyl (C1–C4), or a linear, branched, or cyclic amine with 1 to 8 nitrogen atoms and 1 to 16 carbon atoms.

20. A modified carbon black according to claim 1, wherein the coupler is represented by $$R_2N-(CR_2)_b-Z'-(CR_2)_a-S_x-(CR_2)_a-Z'-(CR_2)_b-NR_2 \quad \text{Formula 3}$$

where x is on average, from 1 to 8,
a is independently at each location an integer from 1 to 4
b is independently at each location an integer from 0 to 6
Z' is —C(O)—N(H)—, —C(O)—N(R)—, —C(O)—O, —N(H)—C(O)—, —N(R)—C(O)—, or —O—C(O)— and where C(O) is a carbon with a pendant =O
R is independently in each occurrence H, lower alkyl ($C_1$–$C_4$), or a linear, branched, or cyclic amine with 1 to 8 nitrogen atoms and 1 to 16 carbon atoms.

21. A modified carbon black according to claim 20, wherein Z' is —C(O)—N(H)— or —N(H)—C(O)—, a is 2, R is H and x is on average 2 to 4.

22. A modified carbon black according to claim 1, wherein said carbon black has been oxidized to increase the amount of polar groups on the surface.

* * * * *